(12) United States Patent
Vavalle

(10) Patent No.: US 9,273,631 B2
(45) Date of Patent: Mar. 1, 2016

(54) SEAMLESS ACOUSTIC LINER

(75) Inventor: Armando Vavalle, East Cowes (GB)

(73) Assignee: GKN Aerospace Services Limited, Hampshire (GB)

( * ) Notice: Subject to any disclaimer, the term of this patent is extended or adjusted under 35 U.S.C. 154(b) by 704 days.

(21) Appl. No.: 13/582,227

(22) PCT Filed: Mar. 1, 2011

(86) PCT No.: PCT/GB2011/000278
§ 371 (c)(1),
(2), (4) Date: Dec. 13, 2012

(87) PCT Pub. No.: WO2011/107733
PCT Pub. Date: Sep. 9, 2011

(65) Prior Publication Data
US 2013/0075193 A1 Mar. 28, 2013

(30) Foreign Application Priority Data
Mar. 2, 2010 (GB) .................................. 1003487.4

(51) Int. Cl.
*B29C 70/30* (2006.01)
*F02K 1/82* (2006.01)
(Continued)

(52) U.S. Cl.
CPC ................ *F02K 1/827* (2013.01); *B23B 39/16* (2013.01); *B26D 3/08* (2013.01); *B29C 70/088* (2013.01); *B29C 70/443* (2013.01); *B29C 70/545* (2013.01); *B29C 70/865* (2013.01); *B29C 70/88* (2013.01); *B64D 33/02* (2013.01); *F02C 7/045* (2013.01); *G10K 11/172* (2013.01); *B23B 2215/04* (2013.01); *B23B 2226/27* (2013.01); *B29C 70/32* (2013.01); *B29K 2105/04* (2013.01);
(Continued)

(58) Field of Classification Search
CPC .. B29C 70/865; B29C 70/443; B29C 70/545; B29C 70/088; B29C 70/88; B29C 70/446
See application file for complete search history.

(56) References Cited

U.S. PATENT DOCUMENTS 3,019,865 A * 2/1962 Rohe .......................... F16B 5/01
411/82
3,300,354 A * 1/1967 Duft .............................. 156/169
(Continued)

FOREIGN PATENT DOCUMENTS

EP  0 911 803 A2  4/1999
EP  1 767 325 A2  3/2007
(Continued)

OTHER PUBLICATIONS

International Search Report and Written Opinion under date of mailing of Nov. 28, 2011 in connection with PCT/GB2011/000278.
(Continued)

*Primary Examiner* — Matthew Daniels
(74) *Attorney, Agent, or Firm* — Bejin Bieneman PLC

(57) ABSTRACT

The invention relates to a method of manufacturing a composite acoustic panel employed in an inlet passage of a gas turbine engine (1). The acoustic panel comprises a permeable face-layer (8), an impermeable backing sheet (9) and a sound absorbing layer (10) disposed therebetween. The method comprises a double polymerisation process for the face-layer and the remainder of the acoustic panel and finally a perforation step to perforate the face-layer according to a predetermined perforation distribution (11.1, 11.2, 11.3, 11.4, 11.5).

27 Claims, 9 Drawing Sheets

(51) Int. Cl.
  *B29C 70/08* (2006.01)
  *B29C 70/44* (2006.01)
  *B29C 70/54* (2006.01)
  *B29C 70/86* (2006.01)
  *B29C 70/88* (2006.01)
  *B64D 33/02* (2006.01)
  *F02C 7/045* (2006.01)
  *G10K 11/172* (2006.01)
  *B26D 3/08* (2006.01)
  *B23B 39/16* (2006.01)
  *B29C 70/32* (2006.01)
  *B29K 105/04* (2006.01)
  *B29K 105/24* (2006.01)
  *B29L 31/60* (2006.01)

(52) U.S. Cl.
  CPC ... *B29K 2105/243* (2013.01); *B29K 2995/0001* (2013.01); *B29L 2031/608* (2013.01); *B64D 2033/0206* (2013.01); *B64D 2033/0286* (2013.01); *F05D 2250/283* (2013.01); *F05D 2260/96* (2013.01); *Y02T 50/672* (2013.01); *Y10T 83/02* (2015.04); *Y10T 156/1057* (2015.01)

(56) References Cited

U.S. PATENT DOCUMENTS

| | | | | |
|---|---|---|---|---|
| 3,451,181 A * | 6/1969 | Neuschotz | | F16B 5/01 411/176 |
| 3,564,798 A * | 2/1971 | Darby | | F16B 5/01 411/82 |
| 3,884,006 A * | 5/1975 | Dietlein | | B23P 19/062 411/360 |
| 3,896,206 A * | 7/1975 | Beaver et al. | | 264/258 |
| 3,952,831 A | 4/1976 | Bernard et al. | | |
| 4,428,705 A * | 1/1984 | Gelhard | | F16B 37/122 29/460 |
| 4,680,216 A | 7/1987 | Jacaruso | | |
| 4,716,067 A * | 12/1987 | Moji | | B29C 70/865 156/292 |
| 4,729,705 A * | 3/1988 | Higgins | | F16B 5/01 411/174 |
| 4,759,513 A | 7/1988 | Birbragher | | |
| 5,092,715 A * | 3/1992 | Theret et al. | | 408/1 R |
| 5,536,344 A * | 7/1996 | van Dreumel | | B29C 65/0672 156/257 |
| 5,581,054 A * | 12/1996 | Anderson et al. | | 181/213 |
| 5,604,010 A * | 2/1997 | Hartz et al. | | 428/118 |
| 5,653,836 A | 8/1997 | Mnich et al. | | |
| 5,685,940 A * | 11/1997 | Hopkins et al. | | 156/291 |
| 5,713,706 A * | 2/1998 | Lozano | | B29C 65/0672 411/171 |
| 5,741,456 A * | 4/1998 | Ayrton | | 264/400 |
| 5,888,036 A * | 3/1999 | Arai et al. | | 408/230 |
| 6,040,552 A * | 3/2000 | Jain et al. | | 219/121.7 |
| 6,051,302 A * | 4/2000 | Moore | | 428/116 |
| 6,451,241 B1 | 9/2002 | Ohliger et al. | | |
| 2002/0036111 A1 | 3/2002 | Noguchi | | |
| 2002/0036115 A1 * | 3/2002 | Wilson | | 181/292 |
| 2002/0157764 A1 | 10/2002 | Andre et al. | | |
| 2003/0089824 A1 | 5/2003 | Sternberger | | |
| 2006/0118357 A1 | 6/2006 | Braun et al. | | |
| 2006/0219477 A1 * | 10/2006 | Ayle | | 181/288 |
| 2007/0020447 A1 | 1/2007 | Yamaguchi et al. | | |
| 2007/0062022 A1 * | 3/2007 | Douglas et al. | | 29/527.1 |

FOREIGN PATENT DOCUMENTS

| | | |
|---|---|---|
| EP | 1 767 325 A3 | 5/2007 |
| EP | 1925551 A1 | 5/2008 |
| EP | 2 017 077 A2 | 1/2009 |
| EP | 2 017 826 A2 | 1/2009 |
| FR | 2 823 590 A1 | 10/2002 |
| FR | 2 914 773 A1 | 10/2008 |
| FR | 2 915 522 A1 | 10/2008 |
| FR | 2 927 271 A1 | 8/2009 |
| GB | 2 256 611 A | 12/1992 |
| GB | 2 407 344 A | 4/2005 |
| JP | 06-159033 | 6/1994 |
| JP | 2000008510 A | 1/2000 |
| JP | 2007315386 A | 12/2007 |
| JP | 2008537604 A | 9/2008 |
| WO | 96/22878 A1 | 8/1996 |
| WO | 01/48734 A1 | 7/2001 |

OTHER PUBLICATIONS

Written Opinion of the IPEA under date of mailing of Jul. 5, 2012 in connection with PCT/GB2011/000278.

* cited by examiner

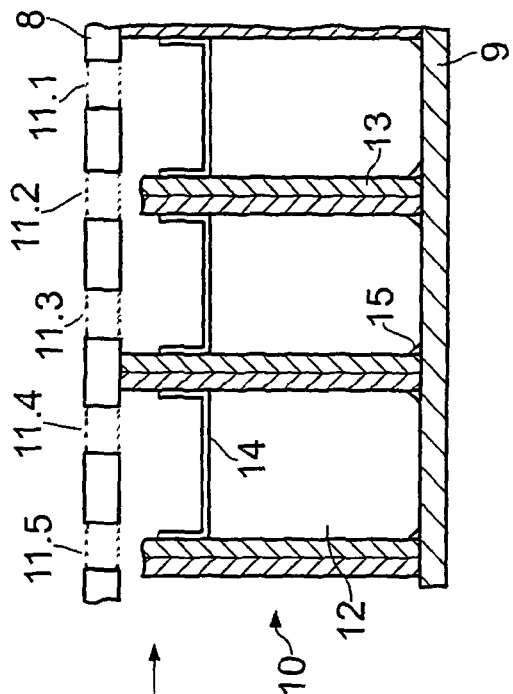
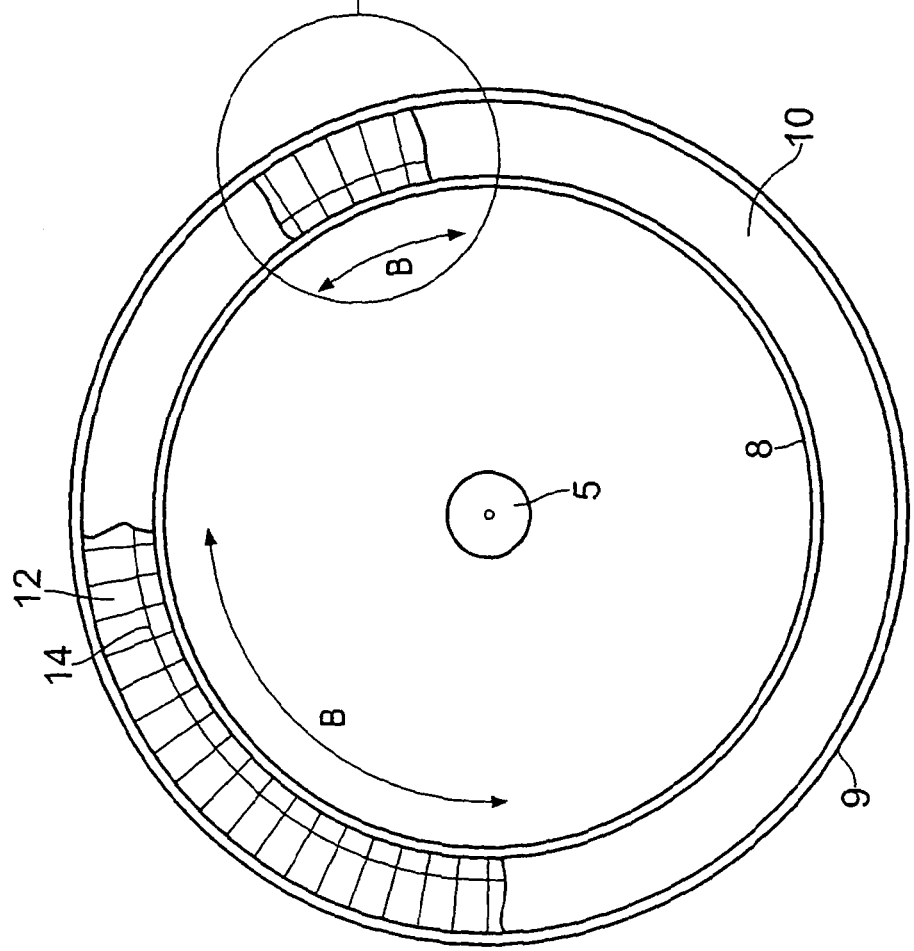

SEAMLESS ACOUSTIC LINER

CROSS-REFERENCE TO RELATED APPLICATIONS

This application represents the national stage entry of PCT International Application No. PCT/GB2011/000278 filed Mar. 01, 2011, which claims the benefit of Great Britain Application 1003487.4, filed Mar. 02, 2010, both of which are hereby incorporated herein by reference for all purposes.

FIELD OF THE INVENTION

The present invention relates to an acoustic liner arrangement particularly, but not exclusively, for use in a gas turbine or turbofan engines of the type fitted to commercial aircraft or the like. The invention extends to a method of manufacturing the same.

BACKGROUND

Noise levels generated by modern commercial aircraft during take-off and landing are of significant importance to aircraft operators. In order to reduce (to attenuate) the noise emitted by aircraft engines, the air intake passages of gas turbine or turbofan engines are generally provided with acoustic liners on the inner surfaces of the engine which are configured to attenuate the noise generated by the engine in operation.

Various designs of noise attenuating panel are known in the art. Generally, the panels comprise a perforated layer defining part of the inlet passage of the engine and a further imperforate layer defining the back of the panel. A honeycomb layer, such as that manufactured by the company Hexcel, is located between the two layers. Thus, noise can be attenuated by the honeycomb layer as air is permitted to enter the honeycomb through the perforated panel.

These existing acoustic panels have resulted in significant improvements in aircraft noise levels. However, with desired increases in fuel economy from aircraft operators the additional weight known acoustic panels add to aircraft engines presents its own problems. One solution to reduce weight is to employ a lighter material such as composite materials. Moving to acoustic panel manufacture using composite materials can mitigate the additional weight problems of acoustic panels. However it significantly increases the cost and complexity of acoustic panel manufacture owing to the nature of composite part manufacturing.

The present invention aims to address the problems associated with the prior art in terms of weight whilst providing an improved acoustic panel at minimal manufacturing cost. This can thereby reduce fuel consumption of the engine and minimise energy use in manufacturing.

INVENTION SUMMARY

A first aspect of the invention is directed to a method of manufacturing a composite acoustic panel comprising a permeable face-layer, an impermeable backing sheet and a sound absorbing layer disposed therebetween, the method comprising the steps of:
  laying-up a composite material laminate to form a face-layer;
  polymerising said laminate to form a substantially continuous face-layer at a first polymerisation pressure of approximately atmospheric pressure or at a pressure greater than atmospheric pressure;
  laying-up of a sound absorbing layer onto the polymerised face-layer;
  laying-up a composite material laminate onto the sound absorbing layer to form a backing layer;
  polymerising the composite acoustic panel at a second polymerisation pressure; and
  perforating the face-layer at a plurality of positions and to a pre-determined depth.

The terms face-sheet and face-layer and backing sheet and backing layer will be used interchangeably (and respectively) throughout the description.

The invention relates particularly, but not exclusively, to an acoustic panel used on the air inlet passage, cowling or similar of a gas turbine engine. In such an application the face-sheet itself defines all or a substantial part of the air inlet passage and is therefore required to have a precise geometry corresponding to the aerodynamic design requirements of the engine inlet.

The present invention allows an acoustic panel to be accurately manufactured, with a significant reduction in weight and at minimal manufacturing costs. This thereby provides significant advantages to both the aircraft manufacturer and to the aircraft fleet operator. These advantages are discussed in more detail below.

As set out above, the manufacturing method according to the present invention involves a two-stage polymerisation process for forming the acoustic panel. The inventor identified that the division of the polymerisation process into two discrete stages results in a surprising overall reduction in manufacturing costs.

The first stage of polymerisation may be performed at a high (e.g. autoclave) or at a low (atmospheric) pressure depending on the temperatures and pressures needed for the particular materials used for the component. A high pressure polymerisation generally allows smaller geometric tolerances to be achieved but increases the cost of manufacture. Conversely, low pressure polymerisation generally reduces manufacturing costs but can increase the tolerances which are achievable for the component.

According to the present invention the first polymerisation pressure and second polymerisation pressure may advantageously be approximately atmospheric pressure to reduce the cost of polymerisation. Advantageously, the first polymerisation pressure may be between approximately 1 and 1.5 bar (15 psi to 20 psi). It has been established by the inventor that a small increase in pressure above atmospheric pressure can advantageously improve the cure whilst controlling the costs of manufacture for some materials.

The second polymerisation pressure may advantageously be atmospheric pressure to reduce the cost of polymerisation during the second stage. The second polymerisation pressure may be between approximately 1 and 1.5 bar (15 psi to 20 psi).

Thus, the first and second polymerisation stages may both be performed at atmospheric pressure or at a pressure of between 1 and 1.5 bar. This advantageously reduces the cost of manufacture and prevents damage to the sound absorbing material.

It will of course be recognised that advances in materials may allow a low pressure polymerisation stage to be performed whilst achieving tight geometric tolerances.

The person skilled in the art recognises that the term high pressure is intended to refer to autoclave conditions and the term low pressure to out-of-autoclave (OOA) conditions.

As set out above the second and separate stage of polymerisation is performed at ambient pressure i.e. what are known in the art as 'out-of-autoclave' conditions. Thus the manufacturing cost can be reduced.

The terms Autoclave conditions and Out-Of-Autoclave (OOA) conditions are terms familiar to people skilled in the art.

The present invention provides a more efficient and economical method of manufacturing an acoustic panel. The use of a two-stage manufacturing process involving a first stage of polymerisation (at a high or low pressure) and then a separate second stage of polymerisation (at low pressure) is in fact counterintuitive.

In existing techniques, because of the geometrical requirements and tolerances of the face-sheet (which forms part of the airflow passage into or within the engine) it is advantageous to polymerise the part under autoclave conditions. Because of this, and to minimise the number of manufacturing steps, the entire component is cured (polymerised) in one stage to create the complete part.

However, the two-stage process according to the present invention actually advantageously reduces the cost of manufacture because the entire cure does not take place under autoclave conditions. Furthermore, cured under reduced pressures advantageously prevents damage to the sound absorbing which can occur at high pressures and temperatures. The present invention also negates the need for reinforced portions on or around the honeycomb layer which may be required to prevent such damage. This further reduces the weight of the component.

In addition, and as discussed in more detail below, dividing the cure into two discrete stages allows greater flexibility in the selection of materials for the other parts forming the acoustic panel and prevents damage which may be caused under autoclave conditions.

References in the following description to the 'laying-up' of laminates, sound absorbing layer and optionally adhesive will be understood by a person skilled in the art of composite part manufacture.

The selection of composite material itself is made depending on the performance requirements of the given panel. According to the present invention the composite material used for the face and backing sheet may be for example a polymer matrix composite material (PMC) using glass, aramid or hybrid fibres as a reinforcement. The term composite material is intended to refer to a suitable material such as carbon fibre, aramid fibres or glass fibres or a suitable combination thereof such as, for example, a combination of carbon fibres and aramid fibres. The composite material may be a uni-directional pre-impregnated composite material according to the desired strength of the component. Alternatively the composite material may be a dry woven fabric interleaved with resin.

The acoustic panel is advantageously formed of a permeable face-sheet which permits air (and thus sound) to pass therethrough. The face-sheet is formed into a generally cylindrical or 'barrel' shape (for example around a mandrel) so as to permit (in use) unhindered flow of air into the engine and to direct air towards the engine compressor blades. Thus, the face-sheet has tight geometric requirements. Autoclave or high pressure polymerisation of the face-sheet advantageously provides the necessary control of geometry of the face-sheet during the manufacturing step and the first manufacturing step may therefore comprise polymerisation at a high pressure under autoclave conditions.

Alternatively, using suitable out-of-autoclave resins, it may be possible to attain the necessary geometric tolerances under out-of-autoclave or low pressure polymerisation conditions thus potentially reducing costs further.

The backing sheet of the acoustic panel is located within the engine housing and is not generally exposed to airflow or required to act as an aerodynamic component. Thus, it is possible to form the backing sheet or layer at a low pressure, for example under out-of-autoclave conditions.

Furthermore, the division of the polymerisation stages also advantageously allows the tolerances of the individual components to be checked with requirements through the manufacturing process thereby providing the optimal part. For example the front sheet can be cured and then measured before the next step of the method is performed.

The sound absorbing layer may be bonded to the facing laying by optionally applying an additional adhesive layer to the cured facing layer before the sound absorbing layer is layed-up onto the facing layer. This improves the bond between the two layers if the resin is insufficient to provide the desired bond strength.

Similarly the backing layer may optionally be bonded to the sound absorbing layer using a suitable adhesive layer before it is layed-up onto the sound absorbing layer. This improves the bond between the two layers if the resin is insufficient to provide the desired bond strength.

The composite parts forming the face-sheet and backing sheet may be formed using conventional laying-up techniques known in the art of composite part manufacture. For example, the respective sheets may be formed by laying a series of pre-impregnated (resin) layers of fibre with a woven fabric around a mandrel corresponding to the desired shape of the face or backing sheet. Alternatively, a continuous strip may be wound around a suitable collapsible mandrel or the like thereby removing any seam or edge to the panel. Laying-up may be performed manually or alternatively using an automated fibre placement machine.

This forming step negates the need for a connecting member linking two ends of a sheet material together to form the barrel shape of the face-sheet. The use of a connecting member, such as a 'boot strap' or plate, significantly reduces the structural strength of the part and the rigidity of the part. It also adds an additional step to the manufacturing process.

As discussed above a continuously uniform surface for the facing-sheet advantageously reduces any turbulence to airflow the sheet might otherwise be caused by joins or the like on the face-sheet surface. Furthermore, a continuous surface has also been found to further improve the sound attenuation properties of the panel as discussed further below.

In forming the face-sheet or backing sheet, the fabric or mesh itself may be pre-impregnated with resin or resin may alternatively be applied to the laminate layers as the layers are layed-up. The resin is then polymerised (also referred to as curing) at the two stages as set out herein to form the hardened face-sheet and hardened backing-sheet.

The face-sheet and backing sheet may advantageously be formed of dissimilar materials in order that costs can be reduced and the materials can be optimised for the given polymerisation (curing) conditions which will be employed according to the manufacture method.

The face-sheet and the backing sheet may be any suitable thickness. The face-sheet may for example be thicker than the backing sheet so as to provide the structural support for the panel and to allow for convenient coupling of the part to the engine. Alternatively, the backing sheet may advantageously be of a reduced thickness to control the weight of the panel whilst still maintaining the necessary sealing properties against the distal face of the sound absorbing layer remote from the face-sheet.

The sound absorbing layer located between the face and backing sheet may be any suitable layer depending on the application and design criteria for the acoustic panel. The sound absorbing layer is generally formed of a plurality of discrete cavities or cells located between the face-sheet and the backing-sheet. The sound absorbing layer is arranged so as to extend as a uniform and substantially seamless layer covering the entire area of the face-sheet. That is the sound absorbing layer is optimises strength and removes any gaps which would otherwise reduce the overall noise attenuation properties of the panel.

The layer may for example be formed of a foam, or the like, arranged to attenuate sound passing into the sound absorbing layer through the permeable face-sheet. In such an arrangement the sound absorbing layer and face and backing sheets may be in direct contact with each other so as to minimise the width of the panel.

A metallic foam, metallic honeycomb (such as aluminium) or a composite honeycomb may be selected as the sound absorbing layer according to the desired structure strength of the panel. A layer of composite or metallic material may be selected for applications requiring a reduced frequency bandwidth where the acoustic liner must be effective i.e. for particular engine applications.

Galvanic corrosion may occur when two materials of different dielectric properties are bonded together and it has been identified that this is also the case with composite materials. Consequently, an additional glass scrim or the like providing electric insulation may be added to the carbon stack before bonding the carbon facing and/or backing layer to the metallic sound absorbing layer.

Advantageously the sound absorbing layer may be formed as a composite honeycomb layer defining a plurality of discrete cells or cavities extending between the face-sheet and the backing sheet. The layer is arranged to act as a resonator for acoustic attenuation. Suitable honeycomb layers are available from suppliers such as HEXCEL, based in Arizona.

The honeycomb layer may also advantageously be septumised i.e. one or more porous septum layers may be located within each of the honeycomb cells between the face-sheet and backing sheet. The particular configuration of honeycomb and septum location within the sound absorbing layer will be pre-determined depending on the attenuation requirements of the given acoustic panel. Multi-layered cavities defined by the septum or septa advantageously broaden the frequency range of attenuation. For example, two septa may be used defining three cavities. The use of a septum generally creates a weight penalty for the same attenuation target frequency range when compared with a single layer (no septum) arrangement. As described the present invention provides a panel with a reduced cross-section and this minimised the overall weight thereby allowing a septum to be employed without a weight penalty.

The sound absorbing layer is preferably configured to correspond to the curvature of the polymerised face-sheet such that the walls defining adjacent cells within the honeycomb layer are not stretched or creased when the layer is layed-up around the face-sheet. For example, the radius of curvature of the outer face (proximate to the backing layer) of the honeycomb layer may advantageously be larger than the inner face (proximate to the face-sheet) to accommodate the curvature of the sound absorbing layer. In effect the honeycomb cells have a tapered geometry.

The septum is arranged to divide each 'cell' of the honeycomb into at least two volumes. That is a first volume proximate the face-sheet and a second volume proximate the backing sheet. The septum extends generally perpendicularly from the side walls of each of the cells and is coupled to the side walls of each cell by means of a portion of the septum material aligning with the cell wall. In effect each septum has a 'rim' portion extending around its periphery which aligns with the cell walls and can be coupled thereto.

The cells may comprise a communication channel extending between adjacent cells at the portion of the cell proximate to the backing layer. In effect the 'honeycomb' has cells which are slotted at a portion of the layer aligning with the bottom segment of the engine. This facilitates drainage of water or the like from cells since the water is able to escape from the cells located at the bottom portion of the engine intake.

The rim portion aligning with the cell walls may either extend from the septum towards the face sheet of the acoustic panel or towards the backing sheet of the acoustic panel. A rim portion extending towards the backing sheet i.e. away from the face sheet allows the septum to be positioned closer to the face sheet than would be possible if the rim extends towards the face sheet. This can provide acoustic i.e. attenuation performance improvements. Conversely, if the rim portion extends away from the face sheet and towards the backing sheet, this allows for more convenient manufacture of the cells and thus the sound absorbing layer.

The method according to an aspect of the invention requires that the face-sheet permeability is provided as a final step in the manufacturing method.

The inventor has identified that perforating the face-sheet of the panel at the end of the process and after a second polymerisation step (of a two step process) provides significant advantages over the art including the following:

(i) the perforations which provide the permeability of the face-sheet can be precisely located on the final curved component. Pre-perforating the face sheet before forming the part does not allow for accurate positioning of perforations in the final acoustic panel (with respect to the cells of the sound absorbing layer) during the laying-up and curing of the panel;

(ii) the perforations can be precisely and uniformity formed through the face-sheet. Tight tolerances for the diameter and uniformity of the holes which are formed through the face-sheet can be provided. Furthermore, perforating the face-sheet at this stage conveniently allows the holes to be accurately formed at the desired angle e.g. perpendicular to the surface of the face-sheet and individual perforations can be advantageously formed with parallel edges thus further optimising acoustic performance;

(iii) any adhesive which may have been applied during the laying-up process can be conveniently removed during the perforating process thereby ensuring all of the perforations are open so as to expose the honeycomb layer;

(iv) any deformation during the polymerisations steps can be accounted for. More importantly, any hole shape deformation due to pre-perforated skin forming to the desired shape is avoided which provides improvements in acoustic performance; and (v) any inaccuracy during the laying-up steps can also be accounted for to still further optimise acoustic performance.

Another advantage of the present invention is that it allows core-crushing or damage to the sound absorbing layer during curing to be prevented. Specifically, the need to introduce reinforcements such as 'angles' can be avoided which would otherwise increase the weight of the part or 'ramps', which would be detrimental to the sound dissipation properties of the panel. The terms 'angles' and 'ramps' are known in the art.

Additional rings (known in the art as Angles) with Z shaped cross-section may be provided during the low-pressure curing of the backing skin. Ramps/Angles may be introduced at the edges of the core to avoid local core crushing due to high pressure (typically in an autoclave process) acting along a direction normal to the edge of the honeycomb layer (honeycomb has very low in-plane compression strength). Un-treated core ramps with imperforated skins, as a remedy, reduce the extent of the acoustic treatment. Treated core ramps with perforated skin introduce a sudden change of acoustic impedance which might not be beneficial.

The desired permeability of the face-sheet can be predetermined for a given acoustic application and engine. This may be through experimentation or through acoustic modelling. This determination establishes the size, location and distribution of perforations in the face-sheet for a given engine design.

The perforations are apertures extending through the width of the face-sheet and may be formed in any suitable way. The apertures are advantageously provided with a smooth and uniform perimeter to prevent any stress concentration in the composite material. The perforations may be example be circular or rounded holes to allow for convenient manufacture using drilling techniques for example.

Alternatively, a laser may be employed to ablate the composite material and to expose (and optionally penetrate into) the sound absorbing layer. For example an Excimer ultraviolet laser may be used to form the apertures with a holographic beam splitter. Such an arrangement advantageously allows heat to be applied to a small location to accurately form the desired small apertures. It will be recognised that the power of the specific laser will depend on the material through which the apertures are to be formed.

This type of low-power laser advantageously prevents heat or contact damage of the face-sheet which may occur with a drilling operation. A holographic beam splitter advantageously makes it possible to form a plurality of apertures in a short period of time thereby reducing manufacturing time and minimise energy use in this stage of manufacture.

Alternatively, a single-spindle or more advantageously a multi-spindle drill head may be used to penetrate the face-sheet to provide the desired permeability. Thus a plurality of holes can be simultaneously drilled through the face-sheet of the completed panel. The drilling apparatus may be positioned and controlled by means of a robotic arm or the like to automate and optimise the processes. In such an arrangement the completed panel may be fixed and the robotic arm controlled to locate the drill bit(s) at the correct position before drilling.

Advantageously the robotic or automated drilling apparatus may be used in conjunction with a second movable member arranged to support and to rotate the polymerised acoustic panel. The second movable member may for example be in the form of horizontal rotatable platform onto which the panel is positioned and secured.

A simplified drilling apparatus may then be employed comprising a reciprocally movable member carrying a plurality of drill heads. The drilling apparatus may then be arranged to move in a vertical direction proximate to the surface of the face-sheet located on the rotatable platform so as to locate the drill bits before penetrating the face-sheet.

The drilling apparatus may comprise any number or distribution of drill bits. The drill bits may though be distributed in a linear arrangement and may be sufficient in number to extend across the width of the panel and to provide the desired hole density. Such an arrangement may advantageously increase the speed of manufacture by allowing a complete row of perforations to be formed in a single drilling movement of the drilling apparatus.

The drilling apparatus and movable workpiece support platform may be arranged in alternative configurations depending on the structural strength of the formed panel and the desired drilling parameters. For example, the drilling apparatus may be arranged to move in a horizontal direction to locate the drill bits before drilling and the workpiece may be arranged in a vertical direction and moved so as to rotation about a horizontal axis of rotation.

The drilling apparatus and movable workpiece support platform may be manually controlled in a step-wise method such that a row of holes is drilled and then the workpiece rotated by the desired rotational angle before drilling the subsequent row of holes. Advantageously the drilling operation may be computer controlled so as to fully automate the process in which case a data processor or the like would be configured to control the movement of the drilling apparatus and to rotate the workpiece automatically through the angle corresponding to the area of permeability desired according to the design.

As discussed above the drilling apparatus may be provided with a single linear row of drill heads. The linear arrangement may alternatively comprise a plurality of row of drill heads spaced and offset according to the desired distribution of the perforations. The number of parallel rows is determined according to the radius of the acoustic panel and the tolerances permitted in respect of the perpendicular arrangement of the drill bit to the face-sheet surface. The larger the radius of the acoustic panel, the more the surface approximates a flat surface over a small angular change.

Additionally, or alternatively, the drilling apparatus may be provided with a plurality of drill head support arms or members, each extending radially from a central axis of the drilling apparatus. The central axis of the drilling apparatus may then be aligned with the central axis of the acoustic panel such that simultaneous drilling around the panel may be performed.

The perforations on the panel are created by stepwise relative angular movement between the drilling apparatus and the acoustic panel. In one arrangement the drilling apparatus may be arranged to move relative to the panel. Alternatively the acoustic panel may be arranged to move relative to the drilling apparatus so minimise the cost of the manufacturing apparatus.

Viewed from another aspect there is provided a method of perforating a face-sheet of a composite acoustic panel with a predetermined perforation distribution pattern, said panel comprising a seamless face-sheet, an impermeable backing sheet and a sound absorbing layer disposed therebetween, the method comprising the steps of:

A—aligning a perforating apparatus relative to the seamless face-sheet at a first perforating position;

B—activating the perforating apparatus to form at least one perforation through the face sheet;

C—moving the acoustic panel and the perforating apparatus relative to one another by a predetermined amount to align the perforating apparatus with a subsequent perforation position; and D—repeating steps B and C until the desired perforation distribution is achieved.

According to the first aspect of the manufacturing method of the present invention, an acoustic panel at the penultimate stage of the manufacturing method is ready to be perforated.

It will be appreciated that the face-sheet defining the inner surface of the 'barrel' of the acoustic panel is substantially continuous and smooth (that is seamless) and it is not therefore possible to determine by visual inspection of the face-sheet how the cells forming the honeycomb sound absorbing layer are orientated relative to the face-sheet.

In exactly the same way as described with reference to other aspects of the invention the perforation apparatus may be a drilling head (comprising one or more drill bit), a laser configured to ablate a portion of the face-sheet (optionally comprising a beam splitter to create a plurality of perforations) or any other suitable means to create the desired perforation(s).

In an arrangement where a beam splitter is employed in conjunction with a laser, the beam splitter itself may be arranged to move with respect to the face-sheet or alternatively the face-sheet may be arranged to move relative to the beam splitter. In such an arrangement it would not be necessary to move the laser itself but merely the optical arrangement used to direct and split the laser beam.

In order to ensure accurate alignment of the perforations with the cells forming the honeycomb layer the cured panel must be carefully positioned relative to the perforation apparatus or tool. The method may therefore additionally comprise the step of positioning the perforating apparatus with respect to a datum defined from the perimeter (or a predetermined part) of the face sheet. This thereby allows the perforations to be located accurately in accordance with the desired distribution pattern.

The perforating apparatus may, as described above, be a drilling apparatus or alternatively a laser perforating apparatus. In an arrangement comprising a laser, a beam splitter may be additionally employed in order that a plurality of perforations can be created simultaneously. In such an arrangement the number of iterative relative movements between the laser and the acoustic panel can be reduce and this thereby further speeds the manufacturing process.

A laser arrangement additionally allows a greater range of perforation diameters to be created. For example the laser may be configured to create perforations ranging from 50 microns (micro perforations) to 1.6 mm (macro perforations) depending on the application.

In either a laser or drilling perforation arrangement, the perforations may extend into the acoustic layer by varying depths depending on the desired acoustic performance. It will be recognised that where the sound absorbing layer comprises no septum then the penetration depth may be limited to the thickness of the face-sheet and will not be limited by the depth of the position of the septum. The maximum depth of penetration for a septumised sound absorbing layer will be either the depth of the septum or alternatively the depth of the rim of the septum measured from the face-sheet.

Advantageously the perforating apparatus is configured to penetrate the face-sheet and further to a predetermined depth extending beyond the thickness of the face-sheet, that is into the sound absorbing layer. An arrangement in which the perforating step is purposely adapted to penetrate into the sound absorbing layer also counterintuitive, not least because of the damage penetrating the septum or walls of the honeycomb might cause to the properties of the sound absorbing layer.

The inventor has established that penetrating (that is drilling or ablating) into the sound absorbing layer surprisingly and advantageously improves the acoustic performance of the panel whilst simultaneously permitting higher speeds of manufacturing. This is particularly advantageous where a honeycomb layer is employed as the sound absorbing material.

Penetrating the face-sheet beyond its inner surface (that is the surface adjacent to the sound absorbing layer) and into the honeycomb layer provides a number of advantages.

First, the drill bit (or laser) is able to penetrate and remove any adhesive or resin that might otherwise obscure (completely or partially) the perforation because of its adhesion to the inner surface of the face-sheet. This optimises the function of the perforations according to the design requirements of the panel i.e. ensures that air can flow through the perforations across the entire area of the perforation.

Furthermore, pre-selecting the penetration depth so as to extend beyond the width of the face-sheet means that the drill/laser may extend into the honeycomb layer itself. The minimum penetration depth is the width of the face sheet and the maximum drilling depth corresponds to the position of the septum or the rim (also known as a tail) of the septum. This maintains the integrity of the septum and its acoustic properties.

The actual predetermined penetration depth between the minimum and maximum described above is selected based on the particular panel construction and the desired acoustic performance. Advantageously the penetration distribution may be selected such that some of the perforations specifically align with the honeycomb cell walls. In such an arrangement a portion of the honeycomb cell wall is removed thereby generating a passage between adjacent cells. It will be recognised that this is counterintuitive but the inventor has established that penetrating at least some of the cell walls in this way improves acoustic performance.

Viewed from a further aspect of an invention there is provided a method of perforating an acoustic panel, said panel comprising a substantially continuous face-sheet, an impermeable backing sheet and a honeycomb sound absorbing layer disposed therebetween, said layer comprising a plurality of discrete cells, the method comprising the steps of:

A—pre-determining a perforation depth h according to:
$$h = t + \in$$
where h is the total perforation depth
t is the thickness of the facesheet
$\in$ is the perforation depth into the sound absorbing layer B—pre-determining a perforation spacing and distribution pattern for the face-sheet surface;

C—aligning a perforating apparatus with the face-sheet;

D—perforating the face-sheet to the predetermined perforation depth h;

E—moving the acoustic panel relative to the perforating apparatus to align the perforating apparatus with a subsequent perforation position; and F—repeating steps D and E until a desired portion of the face-sheet has been perforated.

In an arrangement where the sound absorbing layer is a single layer cavity (that is without a septum) or a metallic foam then the perforation depth into the sound absorbing layer E is preferably between 0.5 and 1 mm.

In an arrangement where the sound absorbing layer is a double-layer septum bonded onto the honeycomb walls of the individual cells (for example a double layer core of the type manufactured by the company Hexcel) then the perforation depth into the sound absorbing layer a is preferably between 0.5 and 5 mm.

Advantageously the perforation may be permitted to align with portions of the face-sheet directly above a honeycomb cell wall. Thus, a portion of the cell walls immediately adjacent to the face-sheet will be removed as the perforations are created. In effect, the perforation spacing and distribution pattern is applied so that a plurality of perforations align with honeycomb cell walls such that a portion of the wall dividing adjacent cells is removed. It have been established that this improves acoustic performance.

Alternatively the perforation apparatus may be arranged to apply the pre-determined spacing and pattern of perforations irrespective of the start point of the perforation apparatus.

This advantageously allows the perforating step, for example by drilling or by laser ablation, to be performed much more rapidly because it negates the need for careful and complex alignment of the perforation apparatus with the acoustic panel. It has been established that not only does this method increase manufacturing speed but additionally by permitting the penetrations to extend into the honeycomb cell walls when the penetration happens to align with the cell wall that acoustic performance of the panel can actually be maintained or even improved.

Perforating into a plurality of the honeycomb cells walls permits incident sound waves passing through the perforation to pass into two adjacent cells by virtue of the removal of the top of the honeycomb cell wall separating the adjacent cells. This removal of the top portion of the cell wall to a predetermined depth maintains the performance of the sound absorbing layer whilst allowing for rapid perforation of the face-sheet.

Advantageously the perforation spacing and pattern may be pre-determined so as to align at least one perforation with at least one wall portion of each cell of the sound absorbing layer. Thus, acoustic performance can be improved by allowing incident sound waves to travel between each and every cell.

It will be recognised that the precise depth of the penetration will depend on the design characteristics of the panel as a whole including the perforation size, distribution and honeycomb layer geometry (including of course the septum location and permeability). This is discussed in more detail below.

It will be further be recognised that although the process terms 'perforating' and 'drilling' have been used to refer to the step of forming the penetrations, other alternative processes may be equally employed.

BRIEF DESCRIPTION OF THE DRAWINGS

Embodiments of the invention will now be described by way of example only with reference to the accompanying drawings in which:

FIG. 2B shows a cross-section of the barrel forming the acoustic panel;

FIG. 2C shows a cross-section through the acoustic panel shown in FIG. 2A;

Figure 2A:
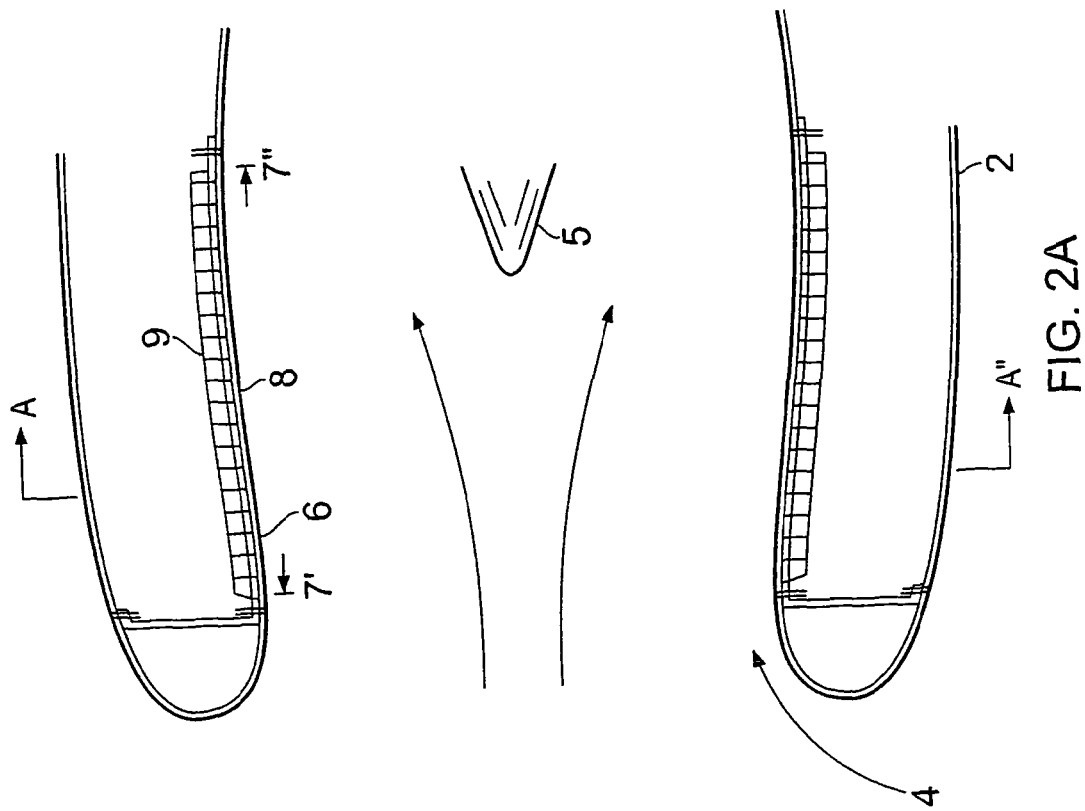
FIG. 2A shows a cross-section of the engine of FIG. 1.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the scope of the claimed invention.

DETAILED DESCRIPTION

Figure 1:
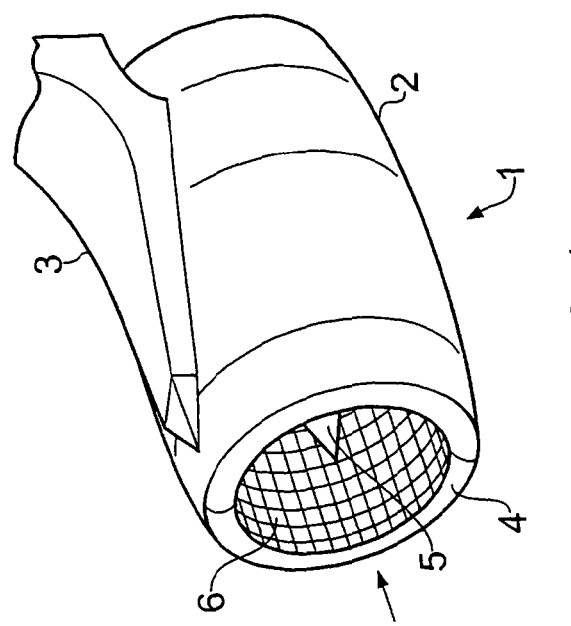
FIG. 1 shows the general arrangement of a turbo fan engine and acoustic panel.

FIG. 1 shows a typical turbofan engine 1 comprising an engine outer casing 2 and a pylori 3 connecting the engine to the aircraft wing or fuselage (not shown).

The engine comprises an air inlet passage 4 extending into the engine and towards the fan blades (not shown) of the engine. The blades are mounted on a rotatable shaft 5 which can be seen in the centre of the inlet passage 4.

Rotation of the fan blades causes undesirable high noise levels to be emitted from the front of the engine. Consequently, and as illustrated in FIG. 1, in order to reduce the noise output from the engine an acoustic liner 6 is arranged within the air inlet up-stream of the fan blades. Noise emitted from the blades in a frontward direction, which would otherwise be reflected from the passage surfaces, can thus be attenuated by the liner 6.

It can be seen from FIG. 1 that the liner shape corresponds to the inlet passage of the engine but can be generally described as a 'barrel' or cylinder shape.

FIG. 2A shows a cross-section view of the front portion of the engine shown in FIG. 1. The general arrangement of the acoustic panel or liner is shown in more detail in FIG. 2B as discussed further below.

The terms liner and panel will be used interchangeably throughout the remainder of the description.

Returning to FIG. 2A the inlet passage is shown in cross-section which permits air to flow into the engine, along the surfaces defined by the acoustic panel and towards the fan blades (not shown). The acoustic liner can be seen to extend from a first upstream position 7' located towards the front portion of the engine to a second position 7" located proximate the fan blades. Between the two positions 7'-7" the acoustic liner is arranged to follow the contour of the inlet passages. In effect this forms a barrel which sits in the front portion of the engine and which defines a boundary of the airflow passage into the engine. The liner extends uniformly around the circumference of the passage and is seamless i.e. the liner is a single generally cylindrical component having a substantially continuous surface.

The method according to the present invention (as described below) allows the liner to be seamless which significantly improves the noise attenuation properties (particularly at high fan speeds) and additionally the aerodynamic characteristics of the component (a reduction in drag).

FIG. 2A also illustrates the cross-section of the liner itself which is shown in more detail in FIG. 2C.

FIG. 2B shows a cross-section view part through A-A' shown in FIG. 2A of the entire acoustic panel viewed from the inlet end of the engine. The engine central shaft 5 can be seen in the centre of the engine. The face-sheet 8 defines the outer periphery of the air inlet passage of the engine 1. Moving through the thickness of the panel from the face-sheet 8, the sound absorbing honeycomb layer 10 is shown and then the impermeable backing sheet 9.

The cut-away sections shown by reference sign B in FIG. 2B correspond to the cross-section through A-A'. The remainder of the view represents the front view of the panel as seen from the front of the engine and illustrates the nacelle which would normally define the leading edge of the engine intake.

Portions B in FIG. 2B illustrate the honeycomb later 10 and septum 14 which divides each of the honeycomb cells 12.

Referring to FIG. 2C, the liner comprises a first face-sheet 8, backing sheet 9 and a sound absorbing layer 10. FIG. 2C is a cross-section of the portion of the panel wall circled in FIG. 2B and shows the view through one row of cells forming the sound absorbing layer in more detail.

The face-sheet 8 is formed of an impermeable layer of composite material according to the manufacturing steps discussed in detail below. As shown in FIG. 2C a plurality of perforations 11.1, 11.2, 11.3, 11.4 and 11.5 are formed through the face-sheet 8. The dashed lines (- - -) indicate the surface profile before perforation.

The sound absorbing layer 10 is formed of a honeycomb acoustic panel as manufactured by Hexcel Corporation under the brand Acousti-Cap™. Honeycomb sound absorbing layers of this type are well known in the art.

Figure 3:
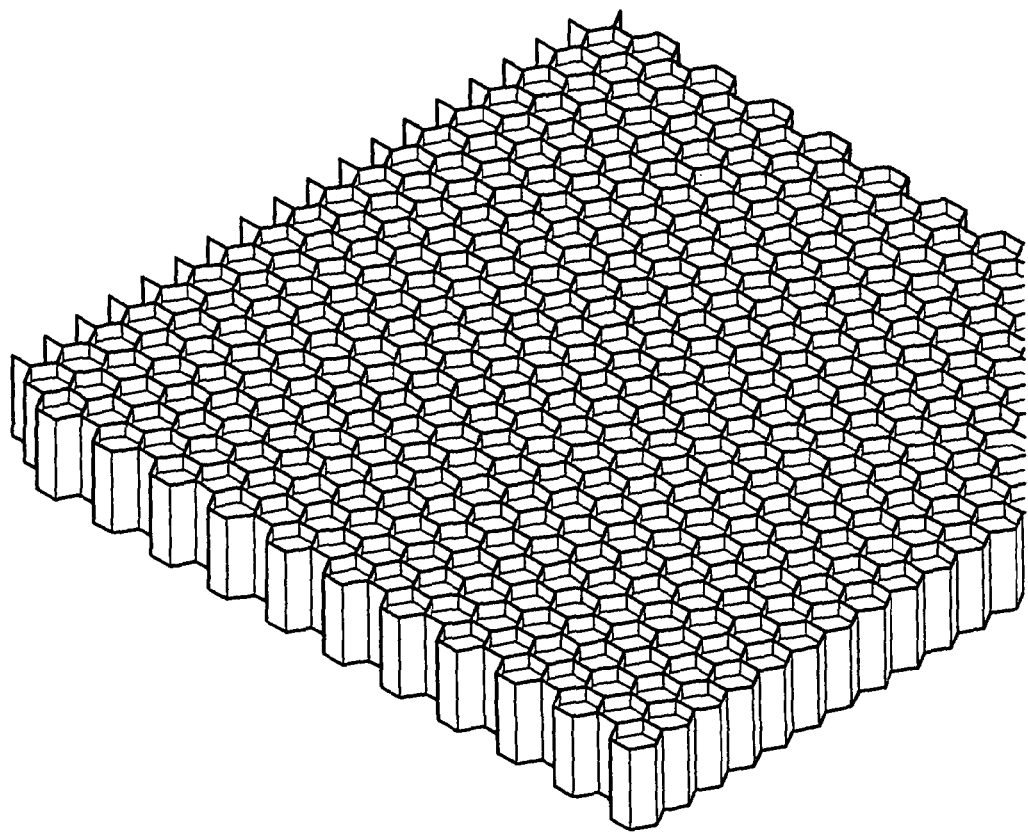
FIG. 3 shows the general arrangement of the cells in a honeycomb sound absorbing layer.

The honeycomb layer 10 comprises a series of chambers 12 which are divided by cell walls which, when the panel is assembled together, extend between the face-sheet 8 and the backing sheet 9. The general arrangement of a sound absorbing layer of this type is shown for example in FIG. 3.

Each cell 12 is divided into 2 sub-cells (or volumes) by a permeable septum 14 as shown in FIGS. 2B and 2C. The cells and septum geometries are optimised for the given engine application i.e. the cells volume, depth and septum porosity and the position of the septum relative to the face and backing sheet. As shown in FIG. 2C the septum 14 of each cell is bonded to the side walls 13 of the cell. The cells are held together with a suitable adhesive 15 as is usual in the art of manufacturing honeycomb layers of this type.

FIG. 2C also shows the perforation spacing between adjacent holes 11.1, 11.2 and so forth. The perforation spacing is predefined depending on the particular acoustic requirements of a given panel and a given application. The spacing is determined based on a number of factors including the hole size (diameter) and POA (Percentage of Open Area) which is the total percentage of the panel which has been drilled. According to the present invention this value may advantageously range from between 1% and 35%.

As also shown in FIG. 2C the perforations 11.1, 11.3 and 11.4 all align with the cavity of the cell 12 i.e. the boundaries of the perforation (the drilled or ablated hole) are within the boundaries defined by the cell walls 13. Conversely, perforations 11.2 and 11.5 can be seen to align with the cell walls 13 of cells 12. This will be discussed in more detail below in respect of the perforation step.

According to the invention the acoustic panel is fabricated using the following steps:

First the face-sheet is layed-up using suitable composite material. This may for example be Plain Weave or Satin 5 Harness 2×2 Twill Fabrics, that is a low or high pressure cure thermoset polymeric matrix.

The composite cloth is layed-up around a mandrel corresponding to the desired shape of the face-sheet using conventional techniques. This may for example be by laying-up the composite material as a helical and overlapping winding around the collapsible mandrel.

Polymerisation (as discussed below) around a collapsible mandrel allows the mandrel to be removed once the part has polymerised so as to release the face-sheet. As is well known to the person skilled in the art, polymerisation causes the resin to flow through the fabric material and to harden thereby creating the composite part in the desired shape.

The mandrel may be collapsible allowing the mandrel to be removed from the part or alternatively non-collapsible. In such a case the mandrel may be axially tapered which allows for the extraction of the work-piece from the mandrel.

The mandrel arrangement and polymerisation result in a face-sheet with a substantially continuous and smooth surface i.e. the surface is void of any splice or gap in its surface which required additional joining in the form of a boot strap or plate. Furthermore, the use of a composite material provides a highly rigid part with minimal weight.

According to the present invention polymerisation takes place in two separate and discrete steps of the manufacturing process. These will now be described.

Step 1—Forming and Polymerisation of the Facing Sheet.

Before polymerisation (curing) the facing sheet is first layed-up and bagged according to conventional composite manufacturing techniques. These terms are known to the person skilled in the art.

Figure 5:
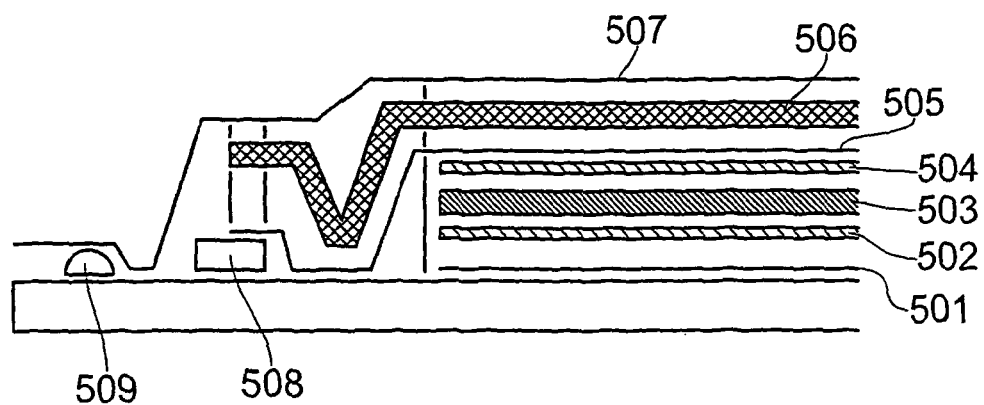
FIG. 5 shows a cross-section through a pre-first stage cure arrangement.

FIG. 5 shows a portion, in cross-section, of the facing-sheet prior to curing. First a release film or agent (501) is applied to the mandrel mould i.e. the mould tool. A peel ply (502) is then applied followed by the pre-impregnated composite laminate stack (503) which forms the shape of the facing sheet. A further peel ply (504) is applied to the laminate (503) followed by a release film (505) and a breather layer (506). As can be seen in FIG. 5 the breather layer (505) extends to the edge breather (508) of the mandrel to allow volatiles to exit from the cavity with in the bag. Finally a nylon vacuum bag (507) is placed over the entire arrangement which is coupled to a vacuum and sealed (509).

Once the composite stack has been layed-up to define the desired shape of the face-sheet and the arrangement and mandrel have been bagged up the face sheet can be cured.

The first cure or polymerisation step can take place at a high pressure i.e. under autoclave conditions or alternatively at ambient pressure under 'out of autoclave' conditions. The selection will depend on the composite materials used and the tolerances desired for the given design.

Option A—Thermal Curing (Polymerisation) Under Autoclave Conditions.

Figure 6:
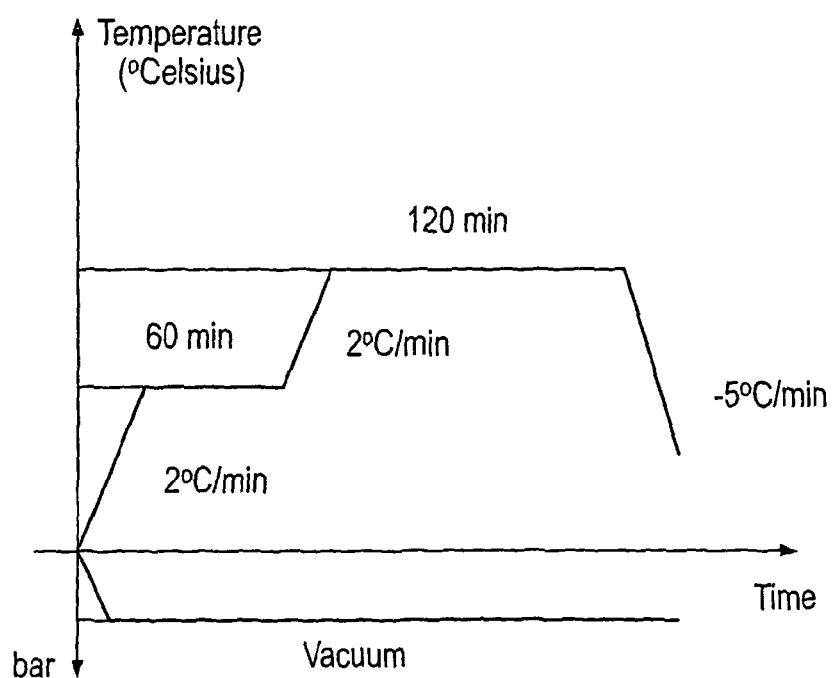
FIG. 6 shows a graph of autoclave curing conditions.

Autoclave conditions require elevated pressures and temperatures and these result in a significant increase in the unit cost of manufacturing a component. FIG. 6 shows a typical cure time for a face sheet. The vacuum indicates the vacuum which is applied to the nylon vacuum bag (507) shown in FIG. 5 and the vertical axis shows the temperature and time profile for curing the face sheet. Curing takes place between 85 and 100 psi.

Option B—Thermal Curing (Polymerisation) Under Out of Autoclave Conditions.

Figure 7:
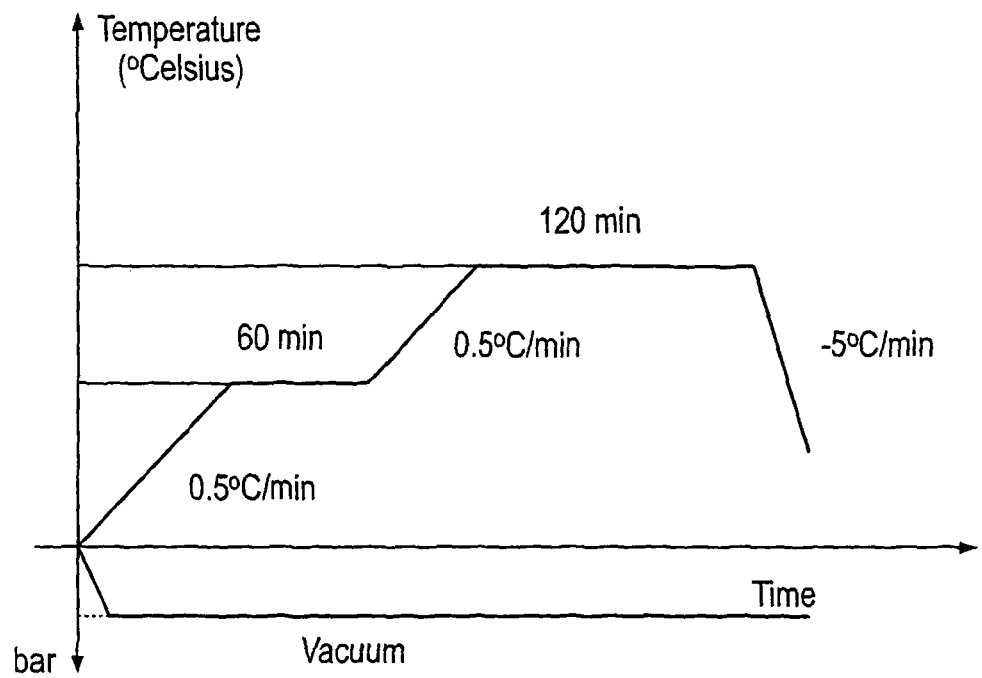
FIG. 7 shows a graph of out of autoclave conditions.

Curing out of the autoclave is achieved using an oven operating at ambient, that is atmospheric, conditions. It will be recognised that this can reduce the unit cost of manufacturing the face sheet. FIG. 7 shows the cure temperature profile for the face sheet under out of autoclave conditions.

Once the face-sheet has been cured (and optionally trimmed) the second stage of curing can take place. Again, the component must be layed up and bagged prior to the second curing step. This is illustrated in FIG. 8.

Figure 8:
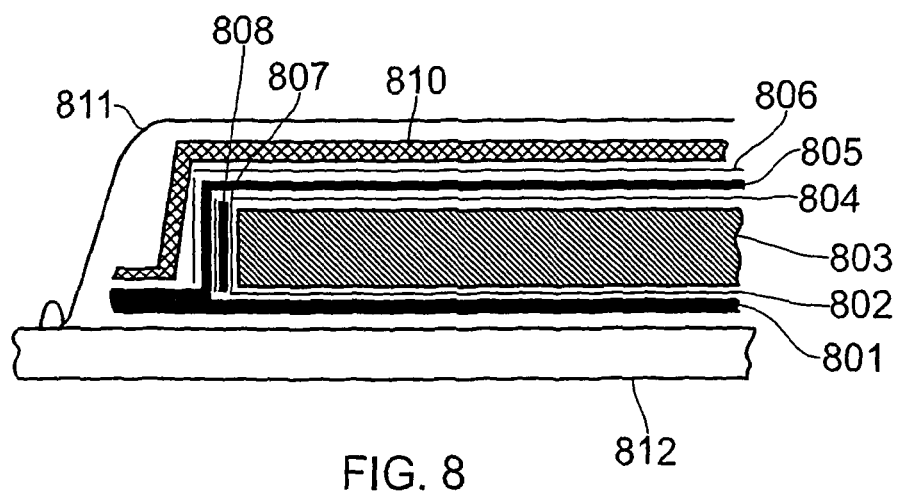
FIG. 8 shows a cross-section through a pre-second stage cure arrangement.

FIG. 8 shows the cured face-sheet (801) formed in the first stage of curing which is located against the mandrel (812). This mandrel will in fact correspond to the mandrel used for the first stage cure.

The sound absorbing layer (803) shown in FIG. 8 is a honeycomb layer which is layed-up against the surface of the face-sheet. This may be pre-impregnated with resin or resin may be applied before laying-up. The honeycomb dimensions and curvature are pre-determined based on the particular engine dimensions and the acoustic requirements of the panel. The layer (803) is arranged around the circumference of the face sheet 'barrel' and is arranged so that the ends of the layer extending around the barrel abut one another such that the sound absorbing layer is also continuous i.e. seamless.

FIG. 8 shows an optional film adhesive (802) applied to the face sheet to bond the sound absorbing layer (803) to the face sheet. Each of the layers shown in FIG. 8 extends around the 'barrel' profile of the face sheet.

A further optional adhesive layer (804) is applied to the opposing side of the sound absorbing layer such that the backing layer can be bonded to the sound absorbing layer (803).

The backing sheet is then define by laying-up a number of laminates of composite material (forming a stack) onto the honeycomb sound absorbing layer to cover the open ends of the cavities shown in FIG. 2C for example. The laminates may be pre-impregnated with resin for the next curing step or resin may be applied separately.

This pre-impregnated composite stack defines the backing layer (805) and is located on top of the adhesive later (804). The backing layer may be layed-up helically around the other surface of the sound absorbing layer.

A pre-cured composite strip (808) is advantageously located on the end of the sound absorbing layer and is arranged to protect the edge of the sound absorbing material once the part is finally cured. This is bonded to the side/edge of the sound absorbing layer with an additional adhesive layer (807). Thus, once cured the sound absorbing layer is encapsulated between the face-layer, backing layer and two opposing end strips (only one of which is shown in FIG. 8).

A breather layer (810) is located over the arrangement again to permit volatiles to be released during the cure cycle. Finally a vacuum bag (811) is arranged to enclose the arrangement prior to curing.

A cure cycle as set out in FIG. 7 is used to provide the second stage of curing. Polymerisation at the second stage is performed at ambient pressure because this prevents the fragile honeycomb layer (which is itself a composite material) being damaged under high pressure and temperature conditions. The structural integrity of the part can thereby be maintained.

It should be recognised that the adhesive layers are described herein as optional because some resins employed in composite component manufacture will bond sufficiently without the need for an additional adhesive. However, the use of an adhesive improves the bond between the layers.

The two-stage polymerisation method according to the present invention allows the face-sheet to be manufactured to very high geometrical tolerances whilst the remainder of the panel can be polymerised under lower pressures. This prevents damage to the panel whilst still maintaining the required geometry of the backing sheet. The method also reduces the number of high pressure cycles and also the size of autoclave which might be required to cure the part. Still further, the method allows the part's geometry to be checked at an intermediate stage before the sound absorbing layer and backing layer are applied.

Once the two stage polymerisation has been completed the acoustic panel can then be perforated according to the designed permeability of the face-sheet. A drilling or a laser ablation technique can be used to create the perforations across the face sheet to a predetermined pattern after the two stage curing process. An example of drilling to form the perforations will now be discussed but laser ablation could equally be used.

Figure 4:
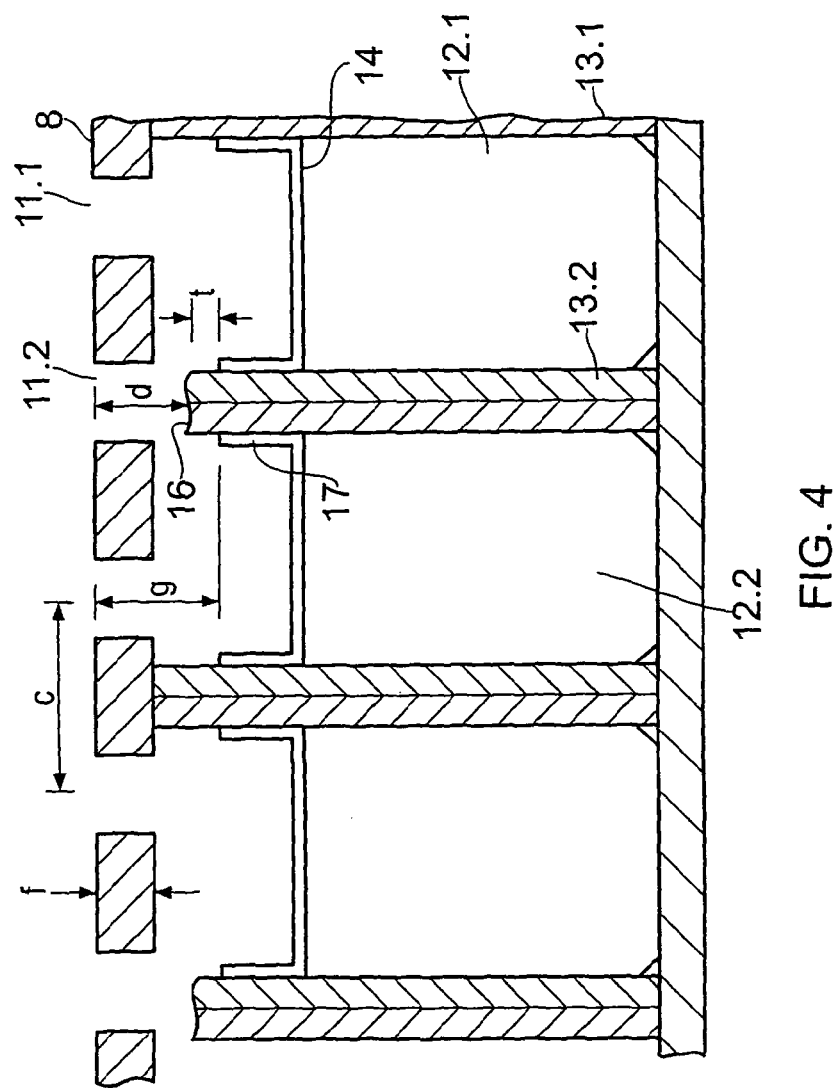
FIG. 4 shows a series of perforated cells in detail.

FIG. 4 shows perforations 11.1 and 11.2 penetrating the face-sheet. The perforations extend to a depth d as shown in FIG. 4. It can be seen that drilling to depth d at position 11.1 merely aligns the drill bit with the cavity of the cell 11 i.e. the drill bit does not contact the cell walls 13.1 or 13.2. At position 11.2 however the drill bit aligns with the cell wall 13.2 and as the drilling action is performed the upper portion of the cell wall 13.2 is drilled away. Thus an upper surface 16 of cell wall 13.2 is exposed and an aperture is formed connecting the two adjacent cells.

As can be see in FIG. 4, the limits of the drilling depth d are at a minimum the thickness of the face-sheet f and at a maximum the distance g between the face-sheet and the upper limit of the septum connection rim or tail 17, where:

$$g=d+t$$

The drilling depth (the perforation depth) h is determined according to:

$$h=t+\in$$

where h is the total perforation depth
t is the thickness of the face layer
$\in$ is the perforation depth into the sound absorbing layer
Additionally h must be less than g to prevent damage to the septum rim or tail as shown in FIG. 4. Thus, the additional requirement of:

$$h<g$$

must be satisfied.

In an arrangement where the sound absorbing layer is a double-layer septum bonded onto the honeycomb walls of the individual cells (for example a Hexcel double layer core) then the perforation depth into the sound absorbing later $\in$ is preferably between 0.5 and 5 mm.

During the drilling step of the manufacturing process perforations are made across the surface of the face-sheet at predetermined interval as shown by c in FIG. 4. According to the present invention the perforation interval c can be set independently of the cell geometry using the principle of a predetermined drill depth d as discussed above. This advantageously allows the perforation spacing to be selected independently of the sound absorbing layer material and also allows the drilling operation to be performed more rapidly because there is no need to attempt to align each drilled hole 11.1, 11.2 with the corresponding cell 12.1 or 12.2.

In one embodiment the spacing of the perforations may specifically be selected to align with the cell walls such that a plurality of cell walls can be drilled or ablated to allow for incidental sound waves to travel between adjacent cells.

The use of the perforating methodology according to the present invention surprisingly and advantageously improves the attenuation properties of the acoustic panel. This is illustrated in FIG. 9.

Figure 9:
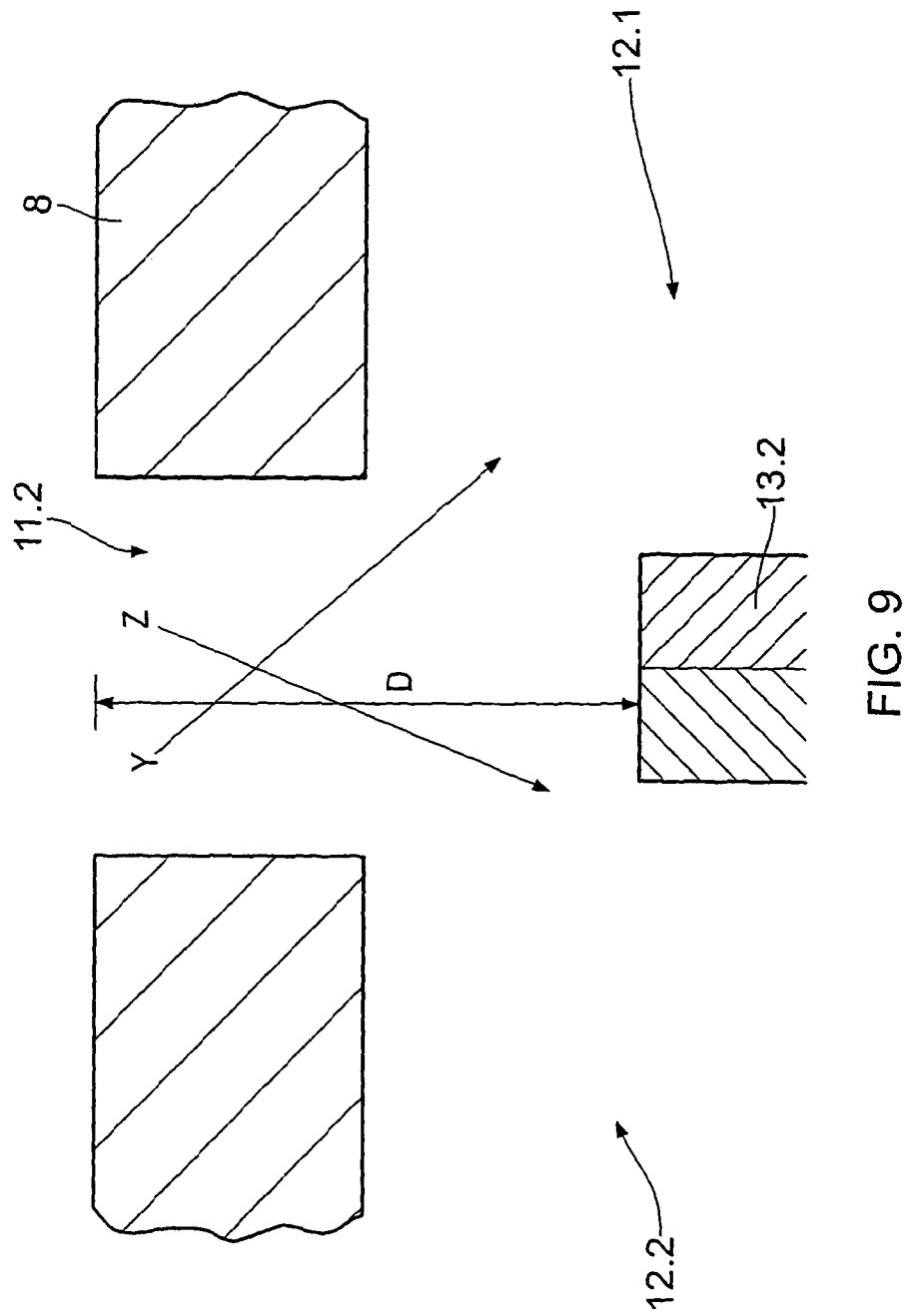
FIG. 9 illustrates incident noise waves and the perforations.

FIG. 9 shows an enlarged portion of the perforated face-sheet at position 11.2 of FIG. 4. As shown in FIG. 9 the drilled perforation or penetration 11.2 aligns with the cell wall 13.2 and has been drilled to a total depth D. A pair of incident sound waves is also illustrated by references Y and Z. It can be seen that the removal of the upper portion of the cell wall allows sound wave Y to enter cell 12.1 and sound wave Z to enter cell 12.2. It has been realised that allowing incidental sound waves entering the drilled hole 11.2 to travel in this way advantageously improves the acoustic performance and attenuation of the panel. This is counterintuitive because it involves actively damaging the cell walls.

It has been established that an optimum design for an acoustic panel according to the invention significantly reduces the broadband and tonal noise output of the engine whilst at the same time minimising weight. The optimal parameters are selected from specific ranges for the face layer open areas (that is the permeability of the panel), the septum depth, the septum DC flow resistance properties and the honeycomb thickness and geometry.

Figure 10:
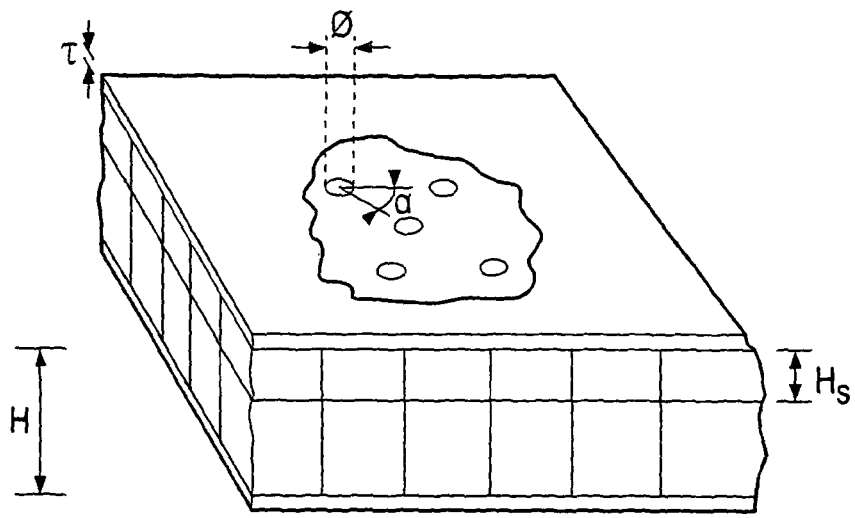
FIG. 10 illustrates the perforation distribution parameters for the optimal values shown in table 1.

Optimal parameters for a thin and a thick design of honeycomb core are set out in the following table with reference to FIG. 10:

| Ref. Symbol (see FIG. 6) | Parameter Description | Thin Design value | Thick Design value |
|---|---|---|---|
| H | Core thickness (mm) | 17 to 30 | 30 to 50 |
| A | Septum DC Flow Resistance Intercept (CgsRayl) | 60 to 95 | 40 to 80 |
| B | Septum DC Flow Resistance Slope (CgsRayl/cms$^{-1}$) | 0.07 to 0.5 | 0.07 to 0.5 |
| Φ | Holes Diameter (mm) | 0.8 to 1.6 | 0.8 to 1.6 |
| τ | Face-sheet thickness (mm) | 0.5 to 1.2 | 1.2 to 5 |
| α | Staggered hole pattern (degrees) | 30 to 70 | 30 to 70 |
| $H_s$ | Septum Depth (mm) | 2 to 8 | 2 to 25 |

Figure 11:
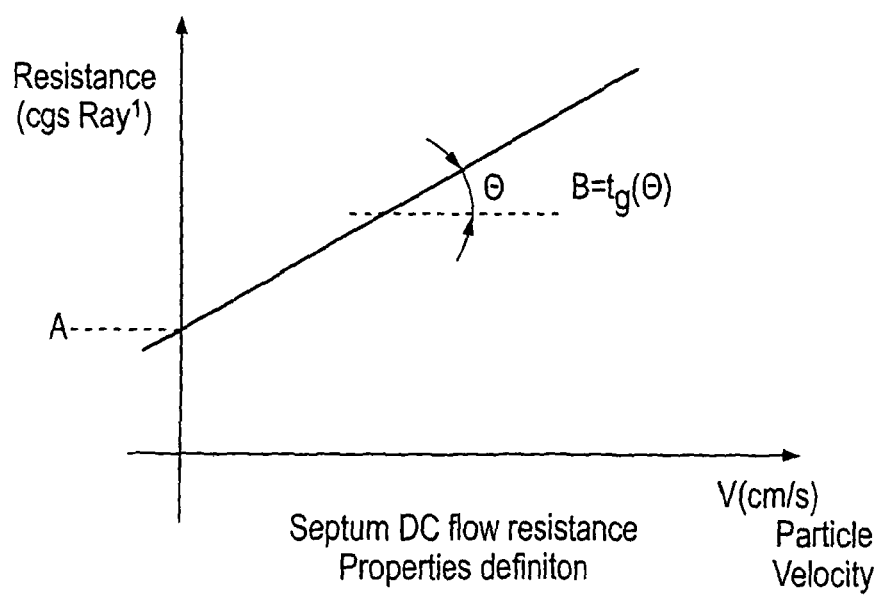
FIG. 11 is a graph showing resistance versus septum flow resistance.

FIG. 11 shows a graph illustrating the design parameters indicated in the above table.

Figure 12:
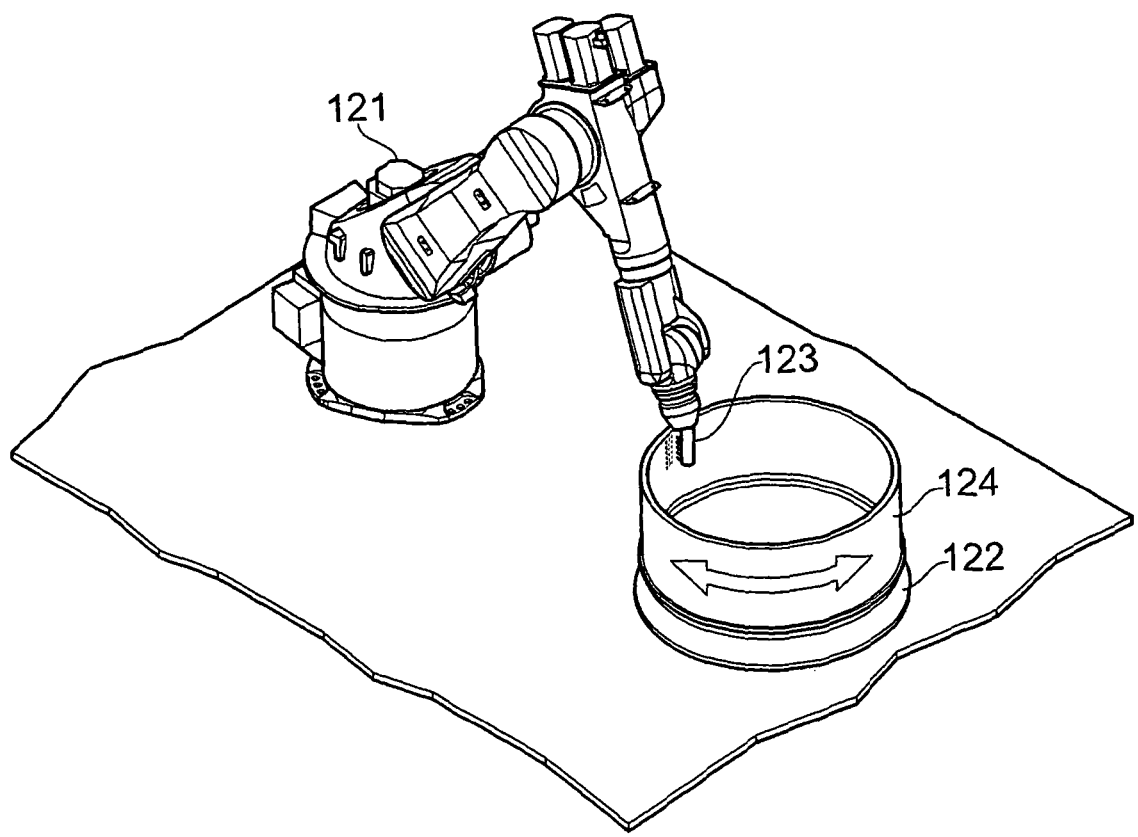
FIG. 12 shows a robotic arm and rotation platform for generating perforations.

FIG. 12 shows a six axis robotic arm (121) and a rotating horizontal platform (122). This in effect provides a 7$^{th}$ axis to the perforation apparatus.

A perforation head (123) is shown which may be a multi-spindle drilling head for example for penetrating the facing laying. In an alternative arrangement the multi-spindle drilling head may be replaced with a laser and an optional beam splitter to permit multiple perforations to be formed.

The cured acoustic panel (124) is shown located and secured to the horizontal platform (122).

The robotic arm (121) and platform (124) are both controlled by a computer arrangement (not shown) which is pre-programmed with the coordinates of the panel and the desired depth and distribution of the perforations for the given panel design. In use the robotic arm locates the perforation head proximate to the face layer surface and moves the drilling head into the face layer to create a plurality of perforations. The drill head is then withdrawn and the horizontal platform (122) rotates the panel (124) step-wise by a predetermined amount corresponding to the perforation distribution around the face layer of the panel. The drilling step is then repeated and the panel rotated again until the entire surface of the seamless panel has been provided with the desired perforations.

The acoustic panel can then be removed and the manufacturing steps are complete.

It will be recognised that the various arrangements and features of the embodiments and aspects of the inventions described herein may be conveniently combined. For example the various perforation forming features may be applied to any of the embodiments or aspects whilst achieving the same respective technical advantage.

The invention claimed is:

1. A method of manufacturing a composite acoustic panel comprising a permeable face-layer, an impermeable backing sheet and a sound absorbing layer disposed therebetween, the method comprising the steps of:
   laying-up a first composite material laminate to form a face-layer;
   subjecting said first laminate to a first polymerisation cycle to form a substantially continuous face-layer at a first polymerisation pressure of approximately atmospheric pressure or at a pressure greater than atmospheric pressure;
   laying-up of a sound absorbing layer onto the polymerised face-layer, the sound absorbing layer comprising a plurality of discrete cells defined by cell walls;
   laying-up a second composite material laminate onto the sound absorbing layer to form a backing sheet;
   subjecting the entire composite acoustic panel to a second polymerisation cycle at a second polymerisation pressure; and
   perforating the face-layer at a plurality of positions and to a pre-determined depth, wherein the perforations range in diameter from 50 microns to 1.6 mm and are arranged to coincide with and penetrate at least one of the cell walls of the sound absorbing layer thereby connecting two adjacent cells.

2. A method as described in claim 1, wherein the first polymerisation cycle is performed in an autoclave and the second polymerisation cycle is performed out-of-autoclave.

3. A method as described in claim 1, wherein the first step of polymersiation cycle is performed out-of-autoclave and a second stage of polymerisation cycle is also performed out-of-autoclave.

4. A method according to claim 1 wherein a second polymerisation pressure is atmospheric pressure or between 1 and 1.5 bar.

5. A method according to claim 1 wherein a first polymerisation pressure is between 1 and 1.5 bar.

6. A method as described in claim 1 wherein the face-layer, impermeable backing sheet and sound absorbing layer are each layed-up to define a generally cylindrical or barrel shape corresponding in shape to a predetermined engine inlet.

7. A method as claimed in claim 6, wherein the face-layer is layed-up around a collapsible mandrel.

8. A method as claimed in claim 6 wherein the face-layer is layed-up around a tapered mandrel allowing the polymerised part to be extracted axially therefrom.

9. A method as claimed in claim 1, wherein the polymerised face-layer is additionally provided with an adhesive layer before the sound absorbing layer is layed-up on to said polymerised face-layer.

10. A method as claimed in claim 1, wherein the sound absorbing layer is additionally provided with an adhesive layer before the backing sheet is layed-up on to said sound absorbing layer.

11. A method as claimed in claim 1, wherein the sound absorbing layer is layed-up on to the polymerised face-layer such that ends of the layer extending around the face-layer are coupled together to define a continuous/seamless sound absorbing layer.

12. A method as claimed in claim 1, wherein the discrete cells are in a honeycomb arrangement.

13. A method as claimed in claim 12, wherein the cells each comprise a septum.

14. A method as claimed in claim 13, wherein the septum comprises a rim or tail extending towards the face-layer.

15. A method as claimed in claim 1, wherein the septum comprises a rim or tail extending towards the backing sheet.

16. A method as claimed in claim 1 wherein an electrically insulating layer is arranged between the face-layer and the sound absorbing layer and/or between the sound absorbing layer and the backing sheet.

17. A method as claimed in claim 1 wherein the perforations are formed by means of a drill head comprising a plurality of drill spindles.

18. A method as claimed in claim 1 wherein the perforations are formed by means of a laser adapted to ablate the material used to form the face-layer.

19. A method as claimed in claim 18, wherein the laser further comprises a beam splitter adapted to allow multiple perforations to be formed simultaneously.

20. A method as claimed in claim 1, wherein the face-layer is moved with respect to the perforation apparatus by means of a rotating member arranged to receive and secure the acoustic panel thereto.

21. A method as claimed in claim 1 wherein the face-layer comprises a percentage of open area of between 1 and 35%.

22. A method as claimed in claim 1, wherein the perforations are arranged to coincide with at least a portion of the wall of each cell forming the sound absorbing layer.

23. A method as claimed in claim 1 where the perforation step and a pre-determined distribution is applied to the face layer irrespective of the start position of the perforation step.

24. A method of preforating a face-layer of a composite acoustic panel with a predetermined perforation distribution pattern, said panel comprising a seamless face-layer, an impermeable backing sheet and a sound absorbing layer disposed therebetween, wherein the sound absorbing layer is formed of a plurality of discrete cells in a honeycomb arrangement, and the cells each comprise a septum, the method comprising steps of:
A—aligning a perforating apparatus relative to the seamless face-layer at a first preforating position;
B—activating the perforating apparatus to form at least one perforation through the face-layer;
C—moving the acoustic panel and the perforating appartus relative to one another by a predetermined amount to align the preforating appartus with a subsequent perforation position; and
D—repeating steps B and C until the desired perforation distribution is achieved, and wherein the perforations extend into the sound absorbing layer to a maximum depth corresponding to the position of a septum where a septum tail extends toward the backing sheet or to a maximum depth corresponding to the position of the septum tail where the septum extends towards the face-layer, and the perforations range in diameter from 50 microns to 1.6 mm and are arranged to coincide with and penetrate at least one wall of the cells of the sound absorbing layer defining a boundary between adjacent cells thereby connecting two adjacent cells.

25. A method of perforating an acoustic panel, said panel comprising a substantially continuous face-layer, an impermeable backing sheet and a honeycomb sound absorbing layer disposed therebetween, said layer comprising a plurality of discrete cells, the method comprising the steps of:
A—pre-determining a perforation depth h according to:
$h = t + \in$ where
h is the total perforation depth
t is the thickness of the face-layer
$\in$ is the perforation depth into the sound absorbing layer
B—pre-determining a perforation spacing and a distribution pattern for a face-layer surface;
C—aligning a perforating apparatus with the face-layer;
D—perforating the face-layer to the predetermined perforation depth h with perforations ranging in diameter from 50 microns to 1.6 mm and with at least one perforation coinciding with and penetrating at least one wall of the cells of the sound absorbing layer thereby connecting two adjacent cells;
E—moving the acoustic panel relative to the perforating appartus to align the perforating apparatus with a subsequent perforation position; and
F—repeating steps D and E until a desired portion of the face-layer has been perforated.

26. A method as claimed in claim 25, wherein the sound absorbing layer is a single layer cavity without a septum or a metallic foam and the perforation depth into the sound absorbing layer c is between 0.5 and 1 mm.

27. A method as claimed in claim 25, wherein the sound absorbing layer is a double-layer septum bonded onto honeycomb walls and the perforation depth into the sound absorbing layer $\epsilon$ is between 0.5 and 5 mm.

* * * * *

UNITED STATES PATENT AND TRADEMARK OFFICE
CERTIFICATE OF CORRECTION

PATENT NO. : 9,273,631 B2  
APPLICATION NO. : 13/582227  
DATED : March 1, 2016  
INVENTOR(S) : Armando Vavalle Page 1 of 1

It is certified that error appears in the above-identified patent and that said Letters Patent is hereby corrected as shown below:

In the claims:

Column 18, in lines 19-21, claim 3, replace "wherein the first step of polymersiation cycle is performed out-of-autoclave and a second stage of polymerisation cycle" with -- wherein the first polymerization cycle is performed out-of-autoclave and the second polymerization cycle --.

Column 19, in line 30, claim 24, replace "preforating appartus" with -- perforating apparatus --.

Column 20, in line 12, claim 25, replace "h=t+€ where" with -- h=t+☐ where --.

Column 20, in line 15, claim 25, replace "€ is the perforation" with -- ☐ is the perforation --.

Column 20, in line 33, claim 26, replace "layer c is between" with -- layer ☐ is between --.

Column 20, in line 37, claim 27, replace "layer ☐ is between" with -- layer ☐ is between --.

Signed and Sealed this  
Seventh Day of June, 2016

Michelle K. Lee  
*Director of the United States Patent and Trademark Office*

UNITED STATES PATENT AND TRADEMARK OFFICE
CERTIFICATE OF CORRECTION

PATENT NO. : 9,273,631 B2  
APPLICATION NO. : 13/582227  
DATED : March 1, 2016  
INVENTOR(S) : Armando Vavalle Page 1 of 1

It is certified that error appears in the above-identified patent and that said Letters Patent is hereby corrected as shown below:

In the claims:

Column 18, in lines 19-21, claim 3, replace "wherein the first step of polymersiation cycle is performed out-of-autoclave and a second stage of polymerisation cycle" with -- wherein the first polymerization cycle is performed out-of-autoclave and the second polymerization cycle --.

Column 19, in line 30, claim 24, replace "preforating appartus" with -- perforating apparatus --.

Column 20, in line 12, claim 25, replace "h=t+€ where" with -- h=t+ε where --.

Column 20, in line 15, claim 25, replace "€ is the perforation" with -- ε is the perforation --.

Column 20, in line 33, claim 26, replace "layer c is between" with -- layer ε is between --.

Column 20, in line 37, claim 27, replace "layer ϵ is between" with -- layer ε is between --.

This certificate supersedes the Certificate of Correction issued June 7, 2016.

Signed and Sealed this  
Nineteenth Day of July, 2016

Michelle K. Lee  
*Director of the United States Patent and Trademark Office*